(12) United States Patent
Restuccia et al.

(10) Patent No.: US 10,507,900 B2
(45) Date of Patent: Dec. 17, 2019

(54) COMPOSITE MATERIALS

(71) Applicant: CYTEC TECHNOLOGY CORP., Wilmington, DE (US)

(72) Inventors: Carmelo Luca Restuccia, Chester (GB); Emiliano Frulloni, Rossett (GB); Fiorenzo Lenzi, Vitulazio (IT)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 168 days.

(21) Appl. No.: 15/665,802

(22) Filed: Aug. 1, 2017

(65) Prior Publication Data

US 2018/0029686 A1  Feb. 1, 2018

Related U.S. Application Data

(63) Continuation of application No. 13/862,874, filed on Apr. 15, 2013.

(30) Foreign Application Priority Data

Apr. 19, 2012  (GB) .................................. 1206885.4

(51) Int. Cl.
*B64C 1/00* (2006.01)
*B29C 70/88* (2006.01)
(Continued)

(52) U.S. Cl.
CPC .................. *B64C 1/00* (2013.01); *B29B 9/12* (2013.01); *B29B 9/14* (2013.01); *B29C 70/025* (2013.01);
(Continued)

(58) Field of Classification Search
CPC ... B64C 1/00; B64C 2001/0072; H01B 3/004; H01B 3/427; B32B 27/08; B32B 5/26;
(Continued)

(56) References Cited

U.S. PATENT DOCUMENTS 5,009,927 A    4/1991  Cloyd et al.
2005/0271838 A1  12/2005  Aisenbrey
(Continued)

FOREIGN PATENT DOCUMENTS

EP    0014104 A1   8/1980
JP    0741577      2/1995
(Continued)

OTHER PUBLICATIONS polymerdatabase.com, Poly(ethersulfone), 2019, obtained from http://polymerdatabase.com/polymers/polyethersulfone.html (Year: 2019).*
(Continued)

*Primary Examiner* — Brian Handville
(74) *Attorney, Agent, or Firm* — Thi Dang

(57) ABSTRACT

A composite material that includes a layer of reinforcing fibres impregnated with a curable resin matrix and a plurality of electrically conductive composite particles positioned adjacent or in proximity to the reinforcing fibres. Each of the electrically conductive composite particles is composed of a conductive component and a polymeric component, wherein the polymeric component includes one or more polymers that are initially in a solid phase and are substantially insoluble in the curable resin, but is able to undergo at least partial phase transition to a fluid phase during a curing cycle of the composite material.

16 Claims, 4 Drawing Sheets

(51) Int. Cl.
| | |
|---|---|
| B32B 7/02 | (2019.01) |
| B32B 27/12 | (2006.01) |
| B29C 70/02 | (2006.01) |
| B29B 9/12 | (2006.01) |
| B29B 9/14 | (2006.01) |
| B32B 5/02 | (2006.01) |
| B32B 27/20 | (2006.01) |
| B32B 27/30 | (2006.01) |
| B32B 27/36 | (2006.01) |
| B32B 27/38 | (2006.01) |
| B32B 5/26 | (2006.01) |
| B32B 27/08 | (2006.01) |
| B64D 45/02 | (2006.01) |
| C08J 5/24 | (2006.01) |
| C08K 3/08 | (2006.01) |
| C08K 7/06 | (2006.01) |
| H01B 3/00 | (2006.01) |
| H01B 3/42 | (2006.01) |
| B29B 11/16 | (2006.01) |
| B29B 9/06 | (2006.01) |

(52) U.S. Cl.
CPC .......... *B29C 70/882* (2013.01); *B29C 70/885* (2013.01); *B32B 5/022* (2013.01); *B32B 5/26* (2013.01); *B32B 7/02* (2013.01); *B32B 27/08* (2013.01); *B32B 27/12* (2013.01); *B32B 27/20* (2013.01); *B32B 27/308* (2013.01); *B32B 27/36* (2013.01); *B32B 27/38* (2013.01); *B64D 45/02* (2013.01); *C08J 5/24* (2013.01); *C08K 3/08* (2013.01); *C08K 7/06* (2013.01); *H01B 3/004* (2013.01); *H01B 3/427* (2013.01); *B29B 9/06* (2013.01); *B29B 11/16* (2013.01); *B29B 2009/125* (2013.01); *B29K 2995/0089* (2013.01); *B32B 2260/023* (2013.01); *B32B 2260/046* (2013.01); *B32B 2262/103* (2013.01); *B32B 2262/105* (2013.01); *B32B 2262/106* (2013.01); *B32B 2264/105* (2013.01); *B32B 2264/108* (2013.01); *B32B 2305/08* (2013.01); *B32B 2305/77* (2013.01); *B32B 2307/202* (2013.01); *B32B 2307/212* (2013.01); *B32B 2605/18* (2013.01); *B64C 2001/0072* (2013.01); *C08J 2363/00* (2013.01); *C08J 2481/06* (2013.01); *C08K 2003/085* (2013.01); *C08K 2003/0806* (2013.01); *C08K 2003/0862* (2013.01); *Y02T 50/43* (2013.01)

(58) Field of Classification Search
CPC ....... B32B 27/38; B32B 27/36; B32B 27/308; B32B 27/20; B32B 5/022; B32B 7/02; B32B 27/12; B32B 2307/212; B32B 2262/106; B32B 2264/108; B32B 2305/08; B32B 2305/77; B32B 2260/046; B32B 2262/103; B32B 2264/105; B32B 2262/105; B32B 2260/023; B32B 2307/202; B32B 2605/18; C08K 3/08; C08K 7/06; C08K 2003/0806; C08K 2003/085; C08K 2003/0862; B64D 45/02; C08J 5/24; C08J 2363/00; C08J 2481/06; B29B 9/14; B29B 9/12; B29B 9/06; B29B 11/16; B29B 2009/125; B29C 70/025; B29C 70/882; B29C 70/885; Y02T 50/43; B29K 2995/0089

See application file for complete search history.

(56) References Cited

U.S. PATENT DOCUMENTS

| | | |
|---|---|---|
| 2008/0295955 A1 | 12/2008 | Cawse et al. |
| 2011/0163275 A1 | 7/2011 | Simmons |
| 2011/0287246 A1 | 11/2011 | Arai |

FOREIGN PATENT DOCUMENTS

| | | |
|---|---|---|
| JP | 2011144213 A | 7/2011 |
| WO | 2008018421 A1 | 2/2008 |
| WO | 2009061635 A1 | 5/2009 |
| WO | 2009118509 A1 | 10/2009 |
| WO | 2009147415 A1 | 12/2009 |

OTHER PUBLICATIONS

Krevelen, D.W. Van, Properties of Polymers Their Correlation With Chemical Structure; Their Numerical Estimation and Prediction from Additive Group Contributions, 1990, pp. 189-225, Elsevier Scientific Publishing Company Inc., New York, U.S.A.

International Search Report PCT/US2013/036555—dated Jan. 31, 2014.

* cited by examiner

COMPOSITE MATERIALS

This application is a Continuation Application of U.S. application Ser. No. 13/862,874 filed on Apr. 15, 2013, which claims the benefit of priority from United Kingdom Application No. 1206885.4 filed on Apr. 19, 2012, both of which are incorporated herein by reference.

BACKGROUND

In the aerospace industry, the use of composites is becoming ever more important as a large number of primary and secondary structures in aircraft frames being made of composite materials. The advantages of composites in aircraft designs include high strength-to-weight ratio, excellent fatigue endurance, corrosion resistance and flexibility, allowing a significant reduction in component parts and the need for fasteners and joints. However, the application of these materials to modern aircraft's primary and secondary structures presents special challenges due to the dielectric nature of the resin matrix. Although the use of carbon fibres as reinforcing fibres in composite materials can deliver some degree of electrical conductivity along their longitudinal direction due to their graphitic nature, the dielectric properties of the matrix resins in the composite materials reduce the overall electrical conductivity of the composite materials and structures. Composites with increased electrically conductivity are required for aircraft primary structures to satisfy stringent requirements for lightning strike protection, potential discharge, electrical grounding and electromagnetic shielding.

The electrical conductivity of resins and composites can be improved by incorporating different conductive particles or polymers in the resin matrix or in the interlaminar regions of the composite structures. Such state of the art material solutions can be used to improve the z-direction conductivity of a composite but not its mechanical performance. The "z-direction" refers to the direction orthogonal to the planes on which the reinforcing fibres are arranged in a composite structure or the axis through the thickness of the composite structure.

SUMMARY

The present disclosure relates to fibre-reinforced composite materials which can provide high conductivity in the thickness direction as well as improved delamination and impact resistance properties. According to one embodiment of the present disclosure, the fiber-reinforced composite material includes:

i) at least one structural layer of reinforcing fibres impregnated with a curable resin matrix; and ii) at least one electrically conductive composite particle adjacent or in proximity to the reinforcing fibres.

The electrically conductive composite particle is a micron-sized particle composed of at least one electrically conductive material dispersed in a polymeric material. As such, each conductive composite particle has a conductive component and a polymeric component. The polymeric component of the electrically conductive composite particles is initially in a solid phase and substantially insoluble in the curable resin matrix prior to curing of the resin matrix, but it is able to undergo at least partial phase transition to a fluid phase during the cure cycle of the resin matrix. The curable resin matrix of the structural layer may be a hardenable composition in which the polymeric component of the conductive composite particle is at least partially soluble during the cure cycle of the resin matrix.

A method for fabricating a multi-layered composite structure having conductive composite particles in the interlaminar regions is also disclosed.

Another aspect of the present disclosure is directed to conductive polymeric fibres and nonwoven structures with properties similar to the conductive composite particles.

DETAILED DESCRIPTION

Figure 1:
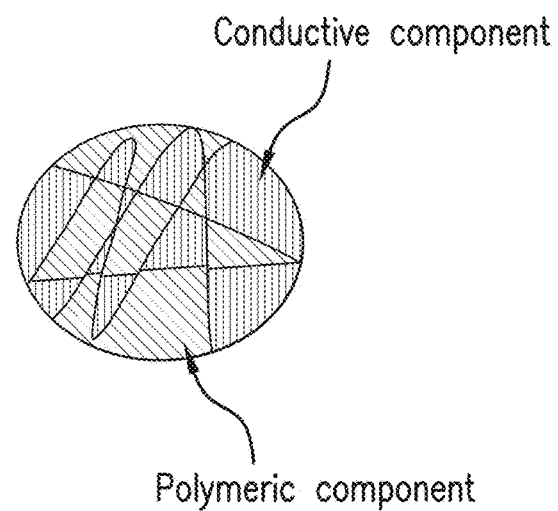
FIG. 1 schematically depicts an electrically conductive composite particle according to one embodiment of the present disclosure.

"Third generation toughened composite materials" have been recently developed for primary structures in aerospace applications. The impact resistance of such materials is improved by alternating a polymeric interleaf between fibre reinforced plies. The presence of interlaminar polymer particles, fibres or films can significantly reduce the electrical conductivity in the "z-direction" of the fibre reinforced composite material due to the dielectric nature of the materials. It is therefore necessary to improve the composite z-direction electrical conductivity in "third generation materials" to ensure acceptable levels of potential discharge and electrical grounding to avoid potential catastrophic failures of composite components or accidents associated with fuel vapor ignition and subsequent fuel tank explosions following a lightning strike event.

The electrical conductivity of resin-based composites may be improved by incorporating different conductive particles or polymers into the resin matrix or in the interlaminar regions of multi-layered composite materials and structures. Metallic fillers may be used at high loadings (usually greater than 50% by weight) to reduce the resin resistivity, but this approach normally results in a significant weight gain and substantial mechanical properties reductions. Conjugated conductive polymers can improve resin system conductivity at relatively low loadings but they jeopardize the thermo-mechanical performance of structural resin systems and prepregs for aerospace applications. Carbon-based additives such as carbon black, carbon nano-tubes, carbon nano-fibres may also be used to modify the composition of resin systems but they present processability and dispersion difficulties, thereby limiting their use in advanced composite structures.

A series of interlaminar particles having a conductive coating have been recently proposed as a solution to create an electrical bridge between two adjacent layers. However, such conductive particles usually can only provide high electrical conductivity or impact resistance properties, but not both.

The present disclosure provides a multifunctional solution that includes a composite material having one or more structural layers of reinforcing fibres impregnated with a curable resin matrix and electrically conductive composite particles with toughening capabilities. Furthermore, when such conductive composite particles are used in the interlaminar regions of multilayered composite structures, they are capable of creating electrical bridges between the structural fibre layers in the multi-layered composite structures. The solution of the present disclosure provides not only improvement in the z-direction conductivity of the composite structures, but also improvements in the mechanical properties, such as inter-laminar fracture toughness and impact resistance. The term "conductive composite particle" will be used from here onwards to denote "electrically conductive composite particles". The conductive composite particles are micron-sized particles composed of at least one electrically conductive material dispersed in at least one polymeric material. As such, each electrically conductive composite particle has an electrically conductive component and a polymeric component.

When a plurality of composite materials are stacked in a multilayer configuration (i.e. a lay-up) and cured, the polymeric component of the conductive composite particles dissolves in the resin matrix of the structural layers, thereby releasing the conductive component, which in turn creates a controlled interlaminar region and a conductive bridge between the fibre layers. This material solution can simultaneously improve the impact resistance and delamination strength of the multilayer composite structure while spreading out or dissipating electric currents, such as those generated by a lightning strike, over a larger area of the composite structure, thereby reducing the likelihood of catastrophic damages to localized portions. Furthermore the conductive composite particles can potentially be an efficient solution to mitigate or eliminate lightning strike direct effect, and in particular, the edge glow phenomenon in third generation composite structures. Finally, the electrically conductive composite particles can provide further benefits in terms of composite electromagnetic performance. Composite particles based on highly conductive and/or magnetic fillers can be used as a flexible tool to tailor the electromagnetic interference (EMI) shielding efficiency, permittivity and magnetic permeability properties of composite structures.

Conductive Composite Particles

FIG. 1 schematically depicts a conductive composite particle according to one embodiment of the present disclosure. Although FIG. 1 shows a spherical shaped particle, it should be understood that the electrically conductive composite particles of the present disclosure are discrete, three-dimensional structures which may be of any suitable shape, including but not limited to, spherical, spheroidal, ellipsoidal, cubic, polyhedral, rod-shaped, disc-shaped, and the like. Furthermore, the particles may have a well-defined geometry or may be irregular in shape.

The mean particle size (d50) of the conductive composite particles is less than 150 μm, preferably within the range of 10-90 μm, more preferably within the range of 10-60 μm. The d50 represents the median of the particle size distribution, or alternatively is the value on the distribution such that 50% of the particles have a particle size of this value or less.

The conductive component of the conductive composite particle may include metallic materials, non-metallic conductive materials, and combinations thereof, having an electrical conductivity greater than $1 \times 10^3$ S/m. Suitable metallic materials include any known metals including, but are not limited to, silver, gold, platinum, palladium, nickel, copper, lead, tin, aluminum, titanium, alloys and mixtures thereof. Preferably, the metallic materials have an electrical conductivity greater than $1 \times 10^7$ S/m, more preferably greater than $3 \times 10^7$ S/m. Suitable non-metallic conductive materials include, but are not limited to, carbon or graphite-based materials.

When the conductive material is metallic, the conductive component is present in the range from 1% to 90% by weight based on the total weight of the conductive composite particle, preferably within the range of 30% to 85% by weight, and more preferably, in the 50%-80% range. When the conductive material is non-metallic or carbon-based, the conductive component is present in the range from 1% to 75% by weight based on the total weight of the conductive composite particle, preferably in the range from 1% to 25% by weight.

The polymeric component of the conductive composite particles may include one or more polymers that are initially in a solid phase and substantially insoluble in a curable resin matrix (i.e., host resin matrix) at room temperature (i.e., 20° C.-25° C.) or at conditions not sufficient for full curing of the resin matrix, but is able to undergo at least partial phase transition to a fluid phase during the curing cycle of the host resin matrix. During the curing cycle, the polymeric component dissolves into the resin matrix upon contact with the resin matrix. In other words, the polymeric component is a material which has no solubility (or negligible solubility) in the curable resin matrix at room temperature or at conditions not sufficient for full curing of the resin matrix (e.g. during the prepreg manufacturing), while its solubility is substantial (i.e., greater than 50% dissolves) or total (i.e., completely dissolves) during the curing cycle of the resin matrix.

As used herein the term "cure" or "curing" refers to the hardening of a resin matrix by cross-linking of polymer chains, brought about by chemical additives, ultraviolet radiation, microwave radiation, electron beam, gamma radiation or other suitable thermal or non-thermal radiation.

The solubility properties of the polymers for the polymeric component in the host curable resin matrix, as discussed in this context, can be determined by several known methodologies including optical microscopy, spectroscopy and the like.

For one material to be soluble in another material, the difference in their solubility parameters ($\Delta\delta$) should be as small as possible. The solubility parameter for a polymer may be determined by a calculation based on the group contribution method described by Van Krevelen (see D. W. Van Krevelen, *Properties of Polymers*, 3rd Revised Edition, Elsevier Scientific Publishing, Amsterdam, 1990, Chapter 7, pp 189-224).

The solubility parameter of a polymer may also be determined using the Hansen Solubility Parameters (HSP) as a way of predicting if one material will dissolve in another to form a solution. The Hansen parameters are based on the idea that "like dissolves like" where one molecule is defined as being "like" another if it bonds to itself in a similar way.

Suitable polymers for the polymeric component of the conductive composite particle may be selected from homopolymers or copolymers of functionalized or un-functionalized thermoplastic resins, singly or in combination with, thermoset resins. Suitable thermoplastic materials may include, by way of example, any of the following, either alone or in combination: polyurethanes, polyketones, polyamides, polyphthalamides, polystyrenes, polybutadienes, polyacrylates, acrylics, polymethacrylates, polyethersulphone (PES), polyetherethersulphone (PEES), poly sulphones, polyesters, liquid crystal polymers, polyimides, polyetherimides (PEI), polyetherketoneketones (PEKK), polyetheretherketones (PEEK), polyarylethers, polyarylsulphides, polyphenylenes, polyphenylene oxide (PPO), polyethylene oxide (PEO), polypropylene oxide. Suitable polymers may also include elastomers (including segmented elastomers) or a combination of thermoplastic polymer and elastomeric polymer.

Preferably, the polymeric component is selected from functionalized thermoplastic polymers which are miscible with suitable thermosettable matrixes, have a high modulus and glass transition temperature ($T_g$), and are tough. In general, thermoplastic polymers having $T_g$ of at least 150° C., preferably greater than 200° C., are suitable.

The number average molecular weight of the thermoplastic polymers may be in the range of 2000 to 60,000. Preferably, it is over 9000, for example 11,000 to 25,000. The presence of these thermoplastic polymers in a host thermoset resin increases the toughness of the cured thermoset resin by providing zones of tough thermoplastic between cross-linked thermoset zones. The functionalized thermoplastic polymer preferably contains pendant or chain-terminating functional groups that will chemically react with functional groups in the thermosetting resin composition to form covalent, ionic or hydrogen bonds. Such functional groups may be obtained by a reaction of monomers or by subsequent conversion of product polymer prior to or subsequent to isolation. Preferably the functional groups of the thermoplastic polymer are of the formula:

-A-Y

Where A is a divalent hydrocarbon group, preferably aromatic, and Y are groups providing active hydrogen, especially OH, $NH_2$, NHR' or SH, where R' is a hydrocarbon group containing up to 8 carbon atoms, or providing other cross-linking reactivity especially epoxy, (meth)acrylate, cyanate, isocyanate, acetylene, ethylene vinyl, allyl, benzoxazine, anhydride, oxazoline, maleimide and monomers containing saturation.

The polymeric component of the conductive composite particle is adapted to undergo complete or partial phase transition, e.g. may completely dissolve, or may partially dissolve. "Partially dissolve" means that a portion of the polymer component is dissolved into the matrix while another portion retains its elemental or original form. Partial dissolution may be achieved either by ensuring that procuring time and temperature are insufficient for complete dissolution or by providing the polymer component as a blend or co-polymer with one or more insoluble polymers, for example, in the form of a random or block-copolymer, or as a blend with or a derivative of organic or inorganic compounds In another embodiment, the polymeric component may comprise a mixture of thermoplastic and one or more thermoset resins, and optionally one or more curing agents and/or catalysts for the thermoset resins. Suitable thermoset materials may include, but are not limited to, epoxy resins, an addition-polymerisation resin, especially bismaleimide resins, acrylics, unsaturated polyesters, vinyl ester resins, cyanate ester resins, isocyanate modified epoxy resins, phenolic resins, benzoxazine resins, formaldehyde condensate resins (such as with urea, melamine or phenol), polyesters, acrylics, reaction products and combinations thereof.

Methods of Making Conductive Composite Particles

Figure 2:
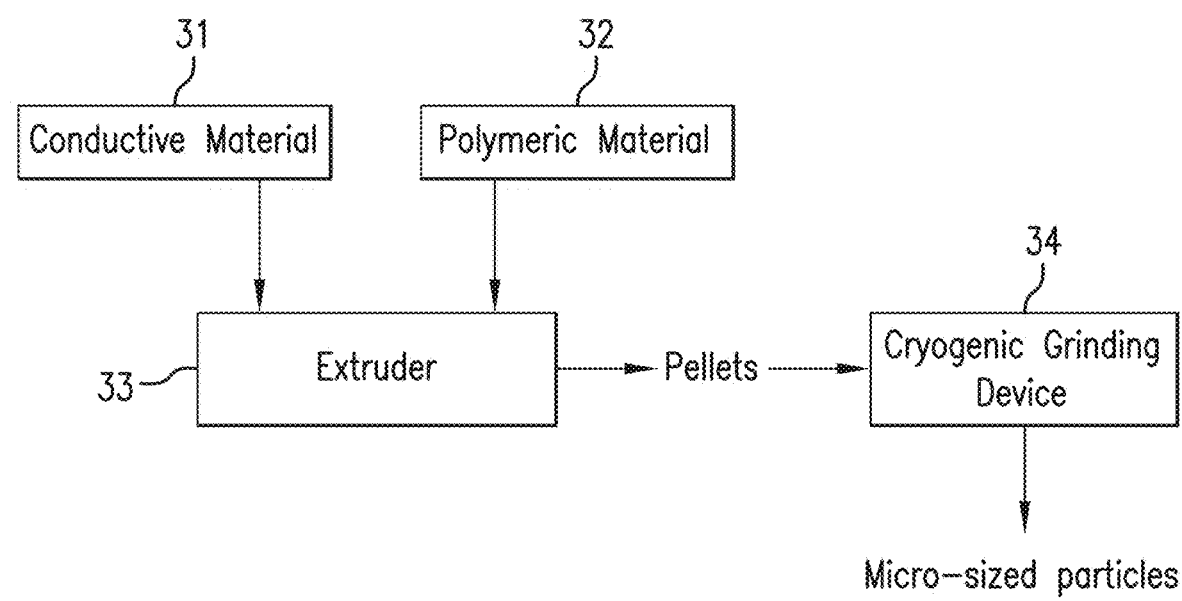
FIG. 2 illustrates an exemplary method for producing electrically conductive composite particles.

The conductive composite particles of the present disclosure may be manufactured according to a single- or multi-step process. In one embodiment, the particles are manufactured by a two-step process, which includes an initial high-shear compounding step to disperse the conductive component into a polymeric material, followed by a particle-size reduction step. An exemplary method for manufacturing the conductive composite particles is illustrated in FIG. 2. A conductive material 31 and a polymeric material 32 are compounded in an extruder 33 to form pellets. It should be understood that the "conductive material" may include one or more conductive materials, and the "polymeric material" may include one or more polymers. In such embodiment, the polymeric material and the conductive material may be fed into the extruder, either simultaneously or sequentially, to form preferably a homogeneous physical blend of the conductive material and polymer. The starting polymeric material 32 being introduced into the extruder may be in an amorphous phase, or in the form of a melt.

The starting conductive material for making the particles may be selected from known metals including, but are not limited to, silver, gold, platinum, palladium, nickel, copper, lead, tin, aluminum, titanium, alloys and mixtures thereof. Furthermore, the starting conductive material may be of any suitable shape and morphology such as flakes, powders, fibres, spheres, dendrites, discs or any other three-dimensional shape with a micrometric or nanometric dimension, singly or in combination. Preferably, the starting conductive material has a high specific surface area and low apparent density. The conductive component preferably has an apparent density (AD) of less than 2.0 $g/cm^3$, and the specific surface area (SSA) is preferably higher than 0.1 $m^2/g$. Examples of suitable metallic materials are low density 525 nickel flakes (AD=0.65 $g/cm^3$, available from Novamet Specialty Products Corp. USA), CAP 9 silver powder (SSA=3.0 $m^2/g$, available from Johnson Matthey, UK), FS34 silver flakes (SSA=1.2 $m^2/g$, available from Johnson Matthey, UK) and CH-L7 granulate copper (AD=0.6-0.7 $g/cm^3$, SSA=0.23 $m^2/g$, available from GGP Metalpowder AG, Germany).

The starting conductive material for making the particles may also be selected from carbon or graphite-based materials such as chopped, short carbon fibres, graphite flakes, graphite nano-platelets, carbon black, single-walled carbon nano-tubes (SWCNT), double-walled carbon nano-tubes (DWCNT), multi-walled carbon nano-tubes (MWCNT), carbon nano-fibres, carbon nano-spheres, carbon nano-rods, fullarenes, carbon nano-ropes, carbon nano-ribbons, carbon nano-fibrils, carbon nano-needles, carbon nano-sheets, graphenes, carbon nano-cones, carbon nano-scrolls (scroll-like shapes), as well as the corresponding boron nitride products thereof, with and without a conductive coating. These "nano-" structures refer to structures having diameters or smallest dimensions of less than 1 micron.

The starting conductive material may also be selected from coated products. Coated products include core-shell structures having an organic or inorganic core, which may be conductive or not, and one or more conductive shells. Suitable metal-coated products include, but are not limited to, metal-coated graphite flakes, metal coated polymers, metal coated fibres, metal coated ceramics, metal-coated glass, metal-coated hollow glass spheres, carbon-coated glass, carbon coated polymers, carbon-coated fibres, carbon-coated ceramics.

Examples of the non-metallic conductive materials are NC7000 multi-walled carbon nano-tubes (available from Nanocyl, Belgium), micrometric 3775 graphite flakes (SSA=23.7 m$^2$/g, available from Asbury Graphite Mills, Inc., USA), micrometric 4012 synthetic graphite flakes (SSA=1.5 m$^2$/g, available from Asbury Graphite Mills, Inc., USA). Examples of the coated products are the nickel-coated graphite flakes from Novamet Specialty Products Corp., USA (AD=1.7 g/cm$^3$-1.9 g/cm$^3$).

The temperature within the extruder should be controlled for optimum rheology of the composition within the extruder, for the type and the amount of conductive material added. In a preferred embodiment, the temperature profile ranges from about 90° C. to about 350° C. A variable temperature profile may be used along the length of the extruder. Optionally, additives, diluents, dispersants, pigments or stabilizers may be added to the polymer/conductive blend to improve the stability, process-ability and dispersion of the conductive material in the polymeric material.

The extruder may be equipped with screws having conventional low or high shear/mixing profiles or a combination thereof, depending on the filler type and content, and on the polymer rheological behaviour. In one embodiment, a sequence of low shear conventional mixing screw sections may be used to achieve satisfactory dispersion levels. In a preferred embodiment, the extruder is equipped with a high-shear screw profile having conventional mixing segments associated with chaotic mixing units in order to create the optimum balance between shear and pressure forces in the barrel for optimizing the dispersion levels, and such process conditions can be achieved by the use of a Prism TS24HC extruder equipped with a 24 mm co-rotating twin screw system with an LD ratio of 40 to 1. Two different feed systems with different feed screws to suit different materials (conductive material or polymer pellets) may be used. A screw speed of approximately 200-300 RPM and a specific temperature profile in the multiple heating zones may be utilized in order to achieve a maximum torque of 60%-95% for a given blend. It should be understood that other methods may be used to disperse the conductive material into the polymeric material using conventional techniques known to a person skilled in the art such as mechanical mixing, sonication, high-shear mixing, rotor stator mixing and sol-gel techniques.

The process for producing the composite particles may also include a particle size reduction/micronization step. Micronization may be conducted according to conventional techniques known in the art, for instance, rotary impact milling, rotoplex milling (i.e. grinding in a Rotoplex grinder manufactured by Hosokawa Micron Co., Ltd.), rotary classifier milling, ball milling, ultrafine milling in a contra-rotating pin mill (e.g. Alpine Contraplex available from Hosokawa Micron Ltd), fluidised bed opposed jet milling, spiral-flow jet milling, cryogenic milling. In a preferred embodiment, the pellets from the extruder 33 (FIG. 2) are then subjected to grinding in an Alpine cryogenic milling system 34 equipped with different rotating grinding media to produce a powder of micro-sized particles having a (d50) mean particle size of less than 150 μm, or less than 60 μm in some embodiments.

Cryogenic grinding is a size reduction process in which the polymer is made brittle and subsequently milled in a cryogen liquid (usually liquid nitrogen or liquid argon) or at a cryogenic temperature. The cryogenic grinding method has been proven to be a cost-efficient and energy-efficient method for producing powders with a fine and controlled particle size distribution while reducing the risks of thermal damage caused by the volatilization or overheating of the constituents. A specific sequence of steps using stud, beater, swing beater and plate beater discs is typically developed to achieve micronized particulates exhibiting the desired average particle size distribution (d50).

Composite Materials and Structures

The conductive composite particles of the present disclosure may be used as interlaminar particles between fibre-reinforced polymer layers, e.g., prepreg plies. As such, the host resin system in this context is the resin matrix of the fibre-reinforced polymer layers or prepreg plies.

The host resin matrix may be a hardenable/thermosettable composition in which the polymeric component of the conductive composite particle is at least partially soluble during the curing cycle, wherein the phase transition to the fluid phase occurs by the dissolution of the polymeric component in the resin matrix. Initially, when the conductive composite particles are in contact with or dispersed in the host resin matrix during mixing or during the prepreg manufacturing process, the composite particles are in a solid phase and are insoluble in the host resin matrix. During the curing cycle of the composite material/resin matrix, the polymeric component of each composite particle substantially or completely dissolves in the host resin matrix, thereby releasing the conductive component as distinct, free-flowing structures in the composite interlaminar region. It should be understood that, in some instances, the polymeric component may not completely dissolve after curing (but substantially dissolve), and hence, the conductive component may be attached to a small remnant of undissolved polymeric material. In some embodiments, phase-separation between the polymeric component and the host resin matrix occurs during the curing cycle of the host resin matrix.

The host resin matrix (or resin system), in which the polymeric component of the composite particles is soluble during curing, may contain one or more uncured thermoset resins, which include, but are not limited to, epoxy resins, bismaleimide, vinyl ester resins, cyanate ester resins, isocyanate modified epoxy resins, phenolic resins, benzoxazine, formaldehyde condensate resins (such as with urea, melamine or phenol), polyesters, acrylics, and combinations thereof. In one embodiment, the host resin matrix is a thermoset composition in which at least 50% of the polymeric component of the conductive composite particle is soluble during the curing of the resin matrix.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the host resin matrix include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 fromMomentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pa·s at 25° C.; glycidyl ethers of phenol Novolac resins (e.g. DEN 431 or DEN 438 from Dow); di-cyclopentadiene-based phenolic novolac (e.g. Tactix 556 from Huntsman); diglycidyl 1,2-phthalate (e.g. GLY CEL A-100); diglycidyl derivative of dihydroxy diphenyl methane (Bisphenol F) (e.g. PY 306 from Huntsman). Other epoxy resins include cycloaliphatics such as 3',4'-epoxycyclohexyl-3,4-epoxycyclohexane carboxylate (e.g. CY 179 from Huntsman).

Generally, the host resin matrix contains one or more thermoset resins in combination with other additives such as curing agents, curing catalysts, co-monomers, rheology control agents, tackifiers, inorganic or organic fillers, elastomeric toughening agents, toughening core-shell particles, stabilizers, inhibitors, pigments, dyes, flame retardants, reactive diluents, soluble or particulate thermoplastics and other additives well known to those skilled in the art for modifying the properties of the resin matrix before or after curing.

The addition of curing agent(s) and/or catalyst(s) in the host resin matrix is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g. Monuron); 3,4-dichlorophenyl-N,N-dimethyl-urea (e.g. Diuron™) and dicyanodiamide (e.g. Amicure™ CG 1200 from Pacific Anchor Chemical).

Bisphenol chain extenders, such as bisphenol-S or thiodiphenol, are also useful as curing agents for epoxy resins. Examples are 3,3'- and 4-,4'-DDS.

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

Figure 3A:
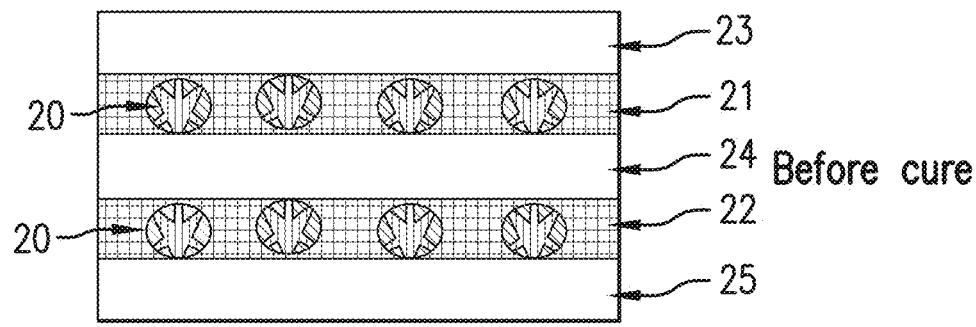
FIG. 3A schematically illustrates a composite structure containing electrically conductive particles in the interlaminar regions prior to curing.
Figure 3B:
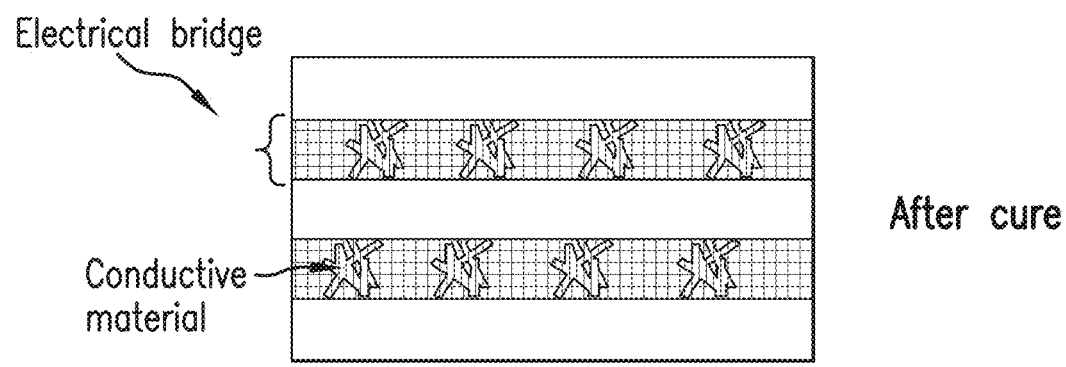
FIG. 3B schematically illustrates the composite structure depicted in FIG. 2A after curing.

FIGS. 3A and 3B illustrate an embodiment in which the conductive composite particles are incorporated in a composite structure. Referring to FIG. 3A, a plurality of conductive composite particles 20 are dispersed in the interlaminar regions 21, 22 formed between curable, composite layers 23, 24, 25. Each of the composite particles 20 contains a mixture of a metallic material and a polymeric material. Each of the composite layers 23, 24, 25 is composed of reinforcing fibres impregnated with a curable resin matrix (i.e., uncured or not fully cured). The resulting laminated material is then subjected curing. Upon curing of the stack of composite layers, the polymeric component of the conductive composite particles 20 undergoes partial or complete phase transition to a fluid phase, and dissolves completely or substantially dissolves in the resin matrix of the composite layers 23, 24, 25, thereby releasing the metallic material into the inter-laminar region as depicted in FIG. 3B. When the composite layers 23, 24, 25 contain conductive reinforcing fibres such as carbon fibres, the released metallic material forms electrically conductive bridges between layers of reinforcement fibres in the z-direction.

The "interlaminar region" refers to the region between adjacent layers of reinforcing fibres in a multi-layered composite structure. Each fibre layer is impregnated with one or more polymeric materials. Such layer may be referred to as "fibre-reinforced polymer layer". The fibre-reinforced polymer layer may take the form of a prepreg. The term "prepreg" as used herein includes a sheet or layer of fibres that has been impregnated with a resin matrix within at least a portion of their volume. The prepreg used for manufacturing aerospace structures is usually a resin-impregnated sheet of unidirectionally aligned reinforcing fibres, often referred to as "tape" or "uni-directional tape". The resin matrix may be present in a partially cured or uncured state. The prepregs may be fully impregnated prepregs or partially impregnated prepregs. Typically, a prepreg is in a form that is ready for molding and curing into the final composite part and is commonly used in manufacturing load-bearing structural parts, such as wings, fuselages, bulkheads and control surfaces of aircrafts. Important properties of the cured prepregs are high strength and stiffness with reduced weight.

A plurality of prepreg plies may be laid up in a stacking sequence to form a "prepreg lay-up." The prepreg plies within the layup may be positioned in a selected orientation with respect to one another, e.g. 0°, ±45°, 90°, etc. Prepreg lay-ups may be manufactured by techniques that may include, but are not limited to, hand lay-up, automated tape layup (ATL), advanced fibre placement (AFP), and filament winding.

Suitably, curing of the composite structure or prepreg layup is generally carried out at elevated temperature up to 200° C., preferably in the range of 170° C.-190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). Preferably, the cure temperature is attained by heating at up to 5° C./min, for example 2° C./min to 3° C./min and is maintained for the required period of up to 9 h, preferably up to 6 h, for example 2 h to 4 h. The use of a catalyst in the resin matrix may allow even lower cure temperatures. Pressure is released throughout, and temperature is reduced by cooling at up to 5° C./min, for example up to 3° C./min. Post-curing at temperatures in the range of 190° C. to 350° C. and atmospheric pressure may be performed, employing suitable heating rates to improve the glass transition temperature of the resin matrix.

For fabricating high-performance composite materials and prepregs, suitable reinforcing fibres may be characterized in general terms as having a tensile strength of greater than 100,000 psi and a tensile modulus of greater than two million psi. Fibres useful for these purposes include carbon or graphite fibres, glass fibres and fibres formed of silicon carbide, alumina, titania, boron and the like, as well as fibres formed from organic polymers such as for example polyolefins, poly(benzothiazole), poly(benzimidazole), polyarylates, poly(benzoxazole), aromatic polyamides, polyaryl ethers and the like, and may include mixtures having two or more such fibres. Preferably, the fibres are selected from glass fibres, carbon fibres and aromatic polyamide fibres, such as the fibres sold by the DuPont Company under the trade name KEVLAR. The fibres may be used in the form of cracked, selectively discontinuous and continuous tows made up of multiple filaments, as continuous unidirectional or multidirectional tapes, or as woven, non-crimped, non-woven fabrics. The woven form may be selected from a plain, satin, or twill weave style. The non-crimped and multi-axial forms may have a number of plies and fibre orientations.

The conductive composite particles are present at a content of 0.1% to 25% by volume based on the total resin content in the composite structure, and preferably in the 5%-15% range. In certain embodiments, the conductive composite particles may be used in combination with non-conductive interlaminar toughening particles. In such embodiments, the combination of conductive and nonconductive particles may be present at a content of up to 25% by volume based on the total resin content of the composite material. Non-conductive interlaminar toughening particles may include functionalized, un-functionalized or cross-linked elastomeric or thermoplastic particles. Suitable materials for the non-conductive particles may be selected from the group consisting of a polyimide material (e.g. P84), an emulsified poly(phenylene oxide) material (e.g. EPPO 16), poly(phenylene oxide) material (PPO), carboxy-terminated butadiene nitrile (CTBN), polyamide (nylon), Poly(etheretherketone) (PEEK). Non-conductive thermoplastic particles may be cross-linked thermoplastic particles, for example, particles composed of cross-linked polyethersulfone (PES), crosslinked polyetherethersulfone (PEES), crosslinked polyetherimide (PEI), crosslinked polyphenylene oxide (PPO), or a cross-linked copolymer thereof.

Methods of Making Composite Materials and Structures

The composite materials of the present disclosure may be manufactured using different processes. In general, a method for incorporating the conductive composite particles in the manufacture of composite materials may include:
(a) dispersing at least one conductive material in a polymeric material to form a composite blend;
(b) optionally heat treating the composite blend;
(c) forming micron-sized conductive composite particles from the composite blend;
(d) optionally heat treating the micron-sized conductive composite particles; and
(e) forming a stack of composite materials which incorporates the conductive composite particles in at least one interlaminar region between adjacent layers of reinforcing fibres, wherein each composite material includes at least one fibre-reinforced polymer layer, wherein fibre-reinforced polymer layer is composed of reinforcing fibres impregnated with a curable resin matrix.

In one embodiment, the conductive composite particles are deposited onto the surface of a prepreg ply prior to laminating multiple prepreg plies together to form a laminated stack that is ready for curing. The composite particles may be deposited via any conventional techniques such as sprinkling, electrostatic deposition, scatter coating, spray distribution, and any other technique known by a person skilled in the art. The distributed composite particles adhere to the surface of the prepreg due to the tack of the resin. When the prepreg plies are stacked together to form a laminate panel, the particles remain in the interlaminar regions of the laminate panel.

In another embodiment, specific amounts of the conductive composite particles are mixed with the curable/uncured resin matrix prior to the prepreg manufacturing. In such embodiment, resin films are manufactured first by coating a particle-containing resin mixture onto a release paper. Then, the resulting resin film is laminated onto a layer of fibres under the aid of heat and pressure to impregnate the fibres, thereby forming a prepreg ply with specific fibre areal weight and resin content. During the laminating process, the conductive composite particles are filtered and remain external to the fibre layer due to the fact that the size of the particles is larger than the spacing between the fibres. Subsequently, when two layers of prepregs containing conductive composite particles are laminated one on top of the other, the conductive composite particles are positioned in the interlaminar region between two adjacent prepreg plies. The polymeric component of the conductive composite particles has negligible or no solubility under normal prepregging conditions.

In an alternative embodiment, a curable resin composition without conductive composite particles is coated onto a release paper to form a resin film, which is then brought into contact with one or both opposing surfaces of a fibre layer. The resin impregnates the fibres and leaves a little or no resin on the external surfaces of the fibre layer. Subsequently, a second film of curable resin containing the conductive composite particles is brought into contact with an outer surface of the resin-impregnated fibre layer. An additional film of curable resin containing the conductive composite particles may be brought into contact with the opposite outer surface of the resin-impregnated fibre layer to form a sandwich structure. As a result, a conductive particle-rich resin layer remains outside of the impregnated fibre layer and does not further impregnate the fibres. A plurality of such structures are laminated together to form a composite structure with conductive composite particles in the interlaminar regions.

In another embodiment, two films of curable resin composition without conductive composite particles are brought into contact with the two opposing surfaces of a fibre layer. The resin impregnates the fibres and leaves little or no resin on the external surfaces of the fibre layer. Subsequently, two films of curable resin containing conductive composite particles are brought into contact with the opposing surfaces of the pre-impregnated fibres layer. A plurality of such structures are laminated together to form a composite structure with conductive composite particles in the interlaminar regions. Such approach is preferred as it tends to provide a well-ordered laminate resulted from the particles not disrupting the placement of the fibres.

The composite materials, structures or prepregs formed by the above methods may be in the form of tapes, towpregs, or webs, with continuous or chopped lengths.

ALTERNATIVE EMBODIMENTS

According to another aspect of the present disclosure, the conductive blend of polymeric material and conductive material used to form conductive composite particles, as discussed above, may be used for manufacturing conductive polymer fibres, non-woven materials and structures (e.g. scrim, mat, web, veil, fleece, fabric, fibre preform, and the like).

The conductive polymer fibres may be produced by techniques known in the art for manufacturing synthetic fibres. Preferably, conductive polymer fibres are obtained by continuous extrusion of the polymer/conductive blend onto reels, followed by mechanical stretching with heating. More preferably, the polymer/conductive blend in a molten form, is drawn off into an elemental shape, cooled, then subjected to a heating and mechanical stretching regime which may orient the polymer chains and render the composite conductive element elastomeric and predisposed to dissolution. Stretching may include pulling the extruded element in air for a desired distance, e.g. 50 to 500 mm. In one embodiment, the polymer/conductive blend, in the form of pellets or other extrudable form is fed to an extruder having a die head (or the like), which is provided with a desired number of apertures or slots.

The fibres may be prepared as multi-filaments of up to 20 filaments, which are drawn off from the molten polymer/conductive blend, cooled and optionally twisted as desired, and then subjected to heating and stretching.

The conductive polymer fibres may be in the form of yarns with mono-filaments of spun strands, extruded strands, cast strands, continuous strands, continuous fibres, bi- or multi-component fibres, random fibres, staple fibres, discontinuous fibres, chopped fibres, whiskers, hollow fibres and filaments, and combinations thereof. The fibre may be both a yarn made up of multiple mono-filaments or single and multiple mono-filaments. Moreover, the fibres may have more complex structures such as sheath/core, side/side, cross-section with pie segments configuration or islands-in-a-sea configuration, and they may be made of different polymers or blends thereof. The conductive polymer fibres may contain additional organic or inorganic fillers or modifiers. Preferably, the fibre or yarn comprises fibre filaments each having a diameter of no more than about 100 μm.

Conductive nonwoven materials formed from the conductive polymer fibres may take the form of nonwoven mats, webs, fleece and veils, which may be produced using conventional manufacturing techniques such as wet-laying, carding, air-laying, spun-bonding, melt-blowing, flash spinning, electrostatic spinning, water-jet punching and needle punching techniques.

In spunbonding, the pellets of conductor/polymer blend are fed in an extruder and the molten product is forced through a plurality of spinnerets to form continuous filaments. The filaments are cooled by means of a stream of air in a blowing area, drawn by aerodynamic forces and then transported to the downstream discharge channel. The filaments are deposited onto a wire mesh conveyor as a nonwoven web of random fibres. This web is transferred to a bonding calender where heat and pressure are applied to set the final product. After cooling, the web may be wound.

In the meltblown process, the conductor/polymer blend in the form of a melt is extruded through a die containing several hundred small orifices. Streams of hot air exiting from the left and right sides of the die rapidly attenuate the extruded polymer streams to form extremely fine filaments. The filaments are then blown by high-velocity air onto a collector screen, thus forming a self-bonded nonwoven web. Alternatively, the extruded, continuous filaments may be chopped into pieces and then scattered onto a heated mandrel to form a nonwoven web, followed by cooling.

A nonwoven veil for use in composite materials may be produced by the nonwoven manufacturing process discussed above without the need of any textile weaving technique. This veil may take the form of a mat or web composed of continuous or chopped fibres arranged randomly. The composition of the fibres includes both a polymeric component and a conductive component as in the case of the conductive composite particles discussed above. As such, the conductive polymeric fibres have properties similar to those of the conductive composite particles. The nonwoven veil is particularly suitable for interposing between, and in contacting relation to, adjacent plies of dry structural reinforcement fibres (such as carbon fibres) in a dry fibre preform that is adapted for liquid resin infusion, or as an interleaf between two adjacent prepreg plies during prepreg layup.

In resin infusion, a dry fibre preform (without resin) is injected with a curable, liquid resin composition. When the nonwoven veil composed of conductive polymeric fibres are incorporated in such dry fibre preform, the polymeric component of conductive polymeric fibres in the veil maintains its solid phase during resin infusion. Then, during the curing of the resin-infused fibre preform, the polymeric component undergoes phase transition to a fluid phase by dissolving in the resin.

When the nonwoven veil composed of conductive polymeric fibres are used in prepregging, the polymeric component of the conductive polymeric fibres in the veil maintains its solid phase during prepreg lay up, then during curing, undergoes phase transition to a fluid phase by dissolving in the resin matrix of the prepreg plies, as discussed above in reference to the interlaminar conductive composite particles.

In another embodiment, the conductive polymer fibres are part of a structural fibre preform adapted for resin infusion, wherein the structural preform is composed of reinforcing fibres combined with conductive polymer fibres. Furthermore, the structural preform may be shaped in a three-dimensional configuration in according to the shape of the final composite structure to be fabricated. The fibres are combined in manner so as to provide a physical association thereof. Combining to provide a physical association may be by methods as known in the art of textiles, for example, by stitching, knitting, crimping, punching, weaving, braiding, overwinding, meshing, co-mingling, aligning, twisting, coiling, knotting, threading, positioning in the same layer of fibres, positioned in different but adjacent layers of fibres and the like. The conductive polymer fibres may be arranged amongst the reinforcing fibres in aligned or mis-aligned, or stitched fashion, or as a multifilament yarn composed of multiple conductive composite fibres and reinforcing fibres. Reinforcing fibres in this context are fibres made of carbon, glass, inorganic oxide, aramides, carbide, boron, ceramic, metal, metal coated fibres or combination thereof. The structural fibre preform is then injected with a curable, liquid resin composition, followed by curing to form a composite structure with conductive properties. The polymeric component of the conductive polymer fibres undergoes the same liquid phase transition during curing as discussed above in reference to the conductive composite particles.

Also contemplated herein are non-crimped fabrics composed of a combination of reinforcing fibres and conductive polymer fibres. "Non-crimped" refers to a fabric wherein multiple layers of fibres are laid upon each other and transformed into a fabric by stitching or by application of a binder such that the fibres remain straight and without substantial crimp. The conductive polymer fibres may be present in one or more layers of the non-crimped fabrics. Furthermore, the conductive polymer fibres may be present non-uniformly with respect to the reinforcing fibres to locally confer properties such as z-direction conductivity and toughening. Such non-crimp fabrics may be incorporated into a structural fibre preform adapted for resin infusion.

Applications

The composite materials of the present invention find utility in any field in which it is required to impart improved conductivity to a composite material/structure. According to one embodiment of the present disclosure, the z-direction conductivity of the composite materials of the present disclosure is at least one order of magnitude greater than the values measured for conventional third-generation carbon fibre reinforced materials.

The composite materials of present disclosure is applicable to the manufacture of components for transport applications (e.g. aerospace, aeronautical, nautical and land vehicles), and including, for instance, primary and secondary aircraft structures (fuselage, wings, bulkheads etc.), space and ballistics structures. The composite materials of present disclosure also find utility in building/construction applications. Furthermore, the composite materials, particularly prepregs and prepreg layups, of the present disclosure are particularly suitable for the fabrication of load-bearing or impact-resisting structures.

EXAMPLES

The examples that follow serve to illustrate some preferred embodiments of the present disclosure, and test results thereof, but they should not be construed as limiting the scope the present disclosure in any way.

Measurement Methods

In the following examples, the following measurement methods were used:

Z-Direction DC Electrical Conductivity

The electrical conductivity of cured composite materials was measured by mean of a Burster-Resistomat 2316 milliohmmeter recording resistance values as the ratio between the applied voltage and current in a bridge method. Kelvin test probes were used to create a contact between two sample surfaces. All measurements were carried out in accordance with the 4-wire measurement method at room temperature (RT) in standard humidity conditions.

Measurements were performed on coupons extracted from defect-free panels prepared in accordance with EN 2565 method B. Approximately 2 mm thick quasi-isotropic square samples (side length=40 mm±0.1 mm) were characterized.

Composite specimen surfaces were prepared by removing the top resin rich layer to expose the carbon fibres underneath ensuring a direct contact with the electrode. Then a commercial silver paste was used to create two electrodes on opposite coupon surfaces. At least 5 samples per material and lay-up were tested.

DC electrical conductivity was calculated in [S/m] in according to the following equation:

$$\sigma_v = \frac{1}{R} \cdot \frac{l}{S}$$

where: R is the measured resistance [Ohm];
l is the sample thickness [m];
S is the sample surface area [m$^2$]

Particle Size Distribution

Particle size distribution was measured using a Malvern Mastersizer 2000 operating in the 0.02 μm to 2000 μm range.

Example 1

Preparation of Nickel-Based Conductive Composite Particles

A sufficient amount of filamentary nickel (Ni) flakes (525 Nickel Powder available from Novamet) to achieve a final concentration of 70% by weight was dispersed in a functionalized polyethersulphone (PES) polymer via a melt mixing process in a twin screw extruder (Sumikaexel 5003P from Sumitomo). A pure sample of the same PES polymer was used as a control. High-shear screw profiles for optimizing the dispersion levels were used. The profiles include conventional mixing segments associated with chaotic mixing units in order to create the optimum balance between shear and pressure forces in the barrel of the extruder. The temperature profile and process conditions used are reported in Table 1.

TABLE 1

| | Composite Nickel/PES blend dispersion conditions | | | | | | | | | | |
|---|---|---|---|---|---|---|---|---|---|---|---|
| Sample | Temperature profile [° C.] | | | | | | | | | Screw speed | |
| code | Zone 1 | Zone 2 | Zone 3 | Zone 4 | Zone 5 | Zone 6 | Zone 7 | Zone 8 | Zone 9 | [rpm] | Torque % |
| 1 | 180 | 240 | 280 | 305 | 305 | 305 | 305 | 300 | 290 | 200 | 81 |

Figure 4:
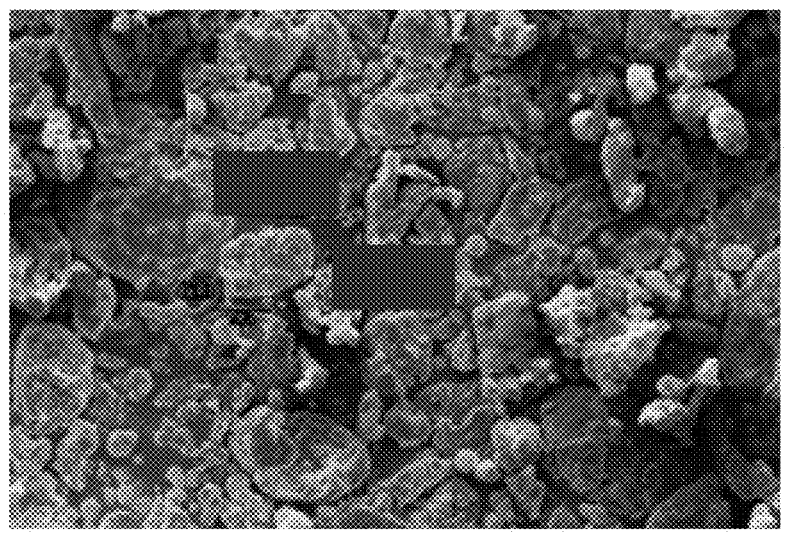
FIG. 4 is a scanning electron microscope (SEM) image showing micro-sized, conductive composite particles manufactured according to one example of the present disclosure.

The resulting Ni/PES blend was subjected to cryogenic grinding to produce micro-sized particles (i.e. "micro-particles") having an average particle size of less than 60 μm using an Alpine cryogenic milling system equipped with different rotating, grinding media. Specifically, multiple passes using stud beater, swing beater and plate beaters were needed to achieve the target particle size distribution. FIG. 4 shows a SEM image of the micron-sized, composite Ni/PES particles produced as the result of cryogenic grinding.

Example 2

Effect of Nickel-Based Conductive Micro-Particles on Electrical Performance of Composite Structures The composite Nickel/PES micro-particles of Example 1 were dispersed via a sprinkling process on the surface of a CYCOM®977-2-34%-194-IMS24K unidirectional tape (unidirectional carbon fibres impregnated with epoxy-based matrix), supplied by Cytec Engineered Materials Ltd, UK. The particle loading was 10% by volume based on the total resin volume in the tape. A plurality of such tapes was laid up, one on top of another, with the micro-particles positioned between adjacent tapes, to form a 1.5 mm thick quasi-isotropic test panel. The panel was then cured according to a 2-hour cure cycle at 180° C. in an autoclave. This test panel was labelled as "2A".

During the curing process, the particles were positioned in the resin-rich area between adjacent carbon fibre layers, which defines the interlaminar region. The thermoplastic component of the composite micro-particles dissolved in the epoxy-based matrix of the tapes during the cure cycle, releasing the metal component (as conductive particles) in the interlaminar regions of the multi-layered panel. In such a way, localized conductive scaffolds or bridges were created between adjacent carbon fibre layers.

For comparison purposes, a similar test panel, labelled as "Reference 1", was manufactured by the same method but the composite PES/Nickel micro-particles were replaced with non-conductive, cross-linked thermoplastic (TP) particles. The z-direction conductivity values for the two test panels are shown in Table 2.

TABLE 2

Particle interleaved composites and corresponding z-direction conductivity values

| Panel code | Non-conductive TP particles (V/V %) | Conductive Ni/PES particles (V/V %) | Conductivity (S/m) |
|---|---|---|---|
| REFERENCE 1 | 10 | — | 0.04 |
| 2A | — | 10 | 0.61 |

The controlled introduction of composite Ni/PES micro-particles in the inter-laminar regions of panel 2A was determined to produce more than one order of magnitude of improvement in the z-direction conductivity as compared to the Reference 1 panel. It is believed that the reduction in the composite volume resistivity is the result of the increased number of electric bridges created through the controlled dissolution mechanism of the composite Ni/PES micro-particles.

Example 3

Effect of Conductive Interlaminar Particles Loading on Mechanical Performance of Composite Structures Two different loadings (10% and 20% by volume) of the same composite Ni/PES micro-particles used in Example 2 were dispersed separately on the surface of CYCOM®977-2-34%-194-IMS24K unidirectional tape from Cytec Engineered Materials, UK. Two test panels with different particle loadings were formed by laying up the tapes with micro-particles dispersed thereon. The resulting test panels were evaluated to determine the effect of the composite micro-particles on thermo-mechanical properties. The test panel containing 10% micro-particles was labelled as "3B", and the test panel containing 20% micro-particles was labelled as "3C". For comparison purposes, a similar test panel, which did not contain composite Ni/PES micro-particles, was manufactured and labelled as "REFERENCE 2". The mechanical performance of the test panels are shown in Table 3.

The introduction of 10% and 20% by volume of the composite Ni/PES particles in panels 3B and 3C, respectively, was determined to produce 60% and 73% improvement, respectively, in delamination growth resistance in Mode I as compared to the REFERENCE 2 panel. A simultaneous 10%-15% increase in delamination growth resistance in Mode II values was also observed. In addition, the introduction of 10% of composite Ni/PES micro-particles resulted in a 25% increase in compression strength after a 30J impact while significantly reducing the damaged area.

Example 4

Effect of Silver-Based Conductive Micro-Particles on Electrical Performance of Composite Structures A sufficient amount of silver (Ag) powder CAPS (from Johnson Matthey, UK) was dispersed in a commercially available, functionalized polyethersulphone polymer (SU-MIKAEXEL 5003P from Sumitomo) via a melt mixing process in a twin screw extruder to achieve a final Ag concentration of 70% by weight of the composite blend (polymeric component+conductive component). High-shear screw profiles were used. The temperature profile and process conditions used are shown in Table 1.

The pellets produced from the extruder were subsequently ground in a cryogenic grinding device to produce composite Ag/PES micro-particles with an average particle size of less than 60 μm.

The composite micro-particles were sprinkled onto CYCOM®977-2-34%-194-IMS5131-24K unidirectional tape surface as described in Example 2, and a plurality of the resulting tapes were laid up to form a quasi-isotropic panel. The panel was then cured at 180° C. for 3 hours in an autoclave. A particle loading of 10% by volume based on the total resin content in the panel was selected for this example. The resulting panel was labelled as "4A".

The z-direction conductivity of the 4A panel was measured according to the method described above. Table 4 shows the comparison in z-direction conductivity between the 4A panel and the Reference 1 panel described in Example 2.

TABLE 4

Particle interleaved composites and corresponding electrical performance

| Sample code | Non-conductive TP particles content (vol %) | Conductive Ag/PES particles content (vol %) | Conductivity (S/m) |
|---|---|---|---|
| REFERENCE 1 | 10 | — | 0.04 |
| 4A | — | 10 | 0.28 |

TABLE 3

Particle interleaved composites and corresponding mechanical performance

| Panel code | Ni/PES particles content (v/v %) | $G_{Ic}$ [J/m²] EN6033 | $G_{IIc}$ [J/m²] EN6034 | CSAI (30J) [MPa] EN6038 | Dent depth [mm] | Damage area [mm²] |
|---|---|---|---|---|---|---|
| REFERENCE 2 | — | 344 | 911 | 226 | 0.16 | 1853 |
| 3B | 10 | 548 | 1003 | 287 | 0.16 | 1334 |
| 3C | 20 | 594 | 1041 | — | — | — |

The introduction of composite Ag/PES micro-particles was found to produce more than half order of magnitude of improvement in the z-direction conductivity as compared to the REFERENCE 1 panel.

Example 5

Effect of the Polymeric Component of Conductive Composite Micro-Particles on Electrical Performance of Composite Structures An alternative conductive composite blend "5A" was produced by dispersing a commercially available granulate Copper (Cu) (CH-L7 from GGP Metalpowder AG) into a commercially available, functionalized polyethersulfone (PES) polymer (SUMIKAEXEL 5003P from Sumitomo, UK) in a twin-screw extruder as described in Example 1. A copper concentration of 65% by weight based on the overall weight of the composite blend was obtained.

Figure 5A:
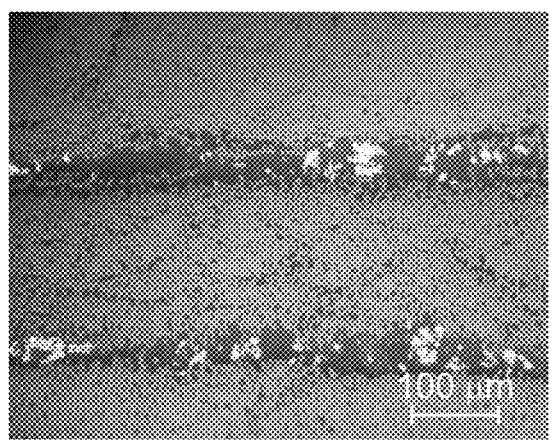
FIGS. 5A and 5B are two micrographs showing cross-sectional views of a cured composite structure based on the incorporation of Copper/Polyamide composite particles in the interlaminar region.
Figure 5B:
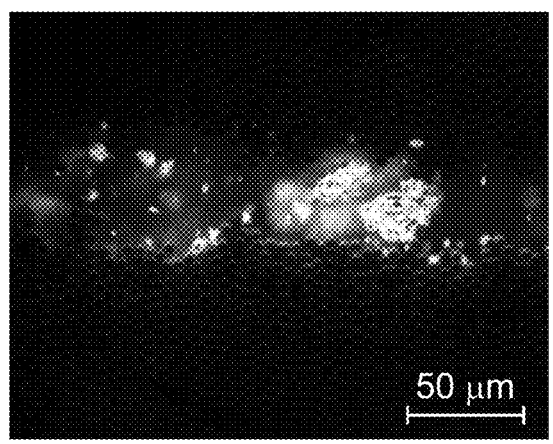

For comparison purposes, a conductive composite blend "5B" was produced by compounding an identical content (65% by weight) of the same copper material in a commercially available polyamide (VESTOSINT 2159, available from Evonik, UK) using the twin screw extruder described in Example 1. The process conditions are shown in Table 5.

from FIGS. 5A and 5B that the polyamide-based particles did not efficiently dissolve into the epoxy matrix during the curing cycle, thus limiting the formation of electric bridges between layers of carbon fibres. Therefore, the introduction of the composite particles in the interlaminar region of the laminated panel did not result in any significant improvement in the z-direction conductivity over the standard non-conductive thermoplastic interleaved panel (Reference 1).

Figure 6:
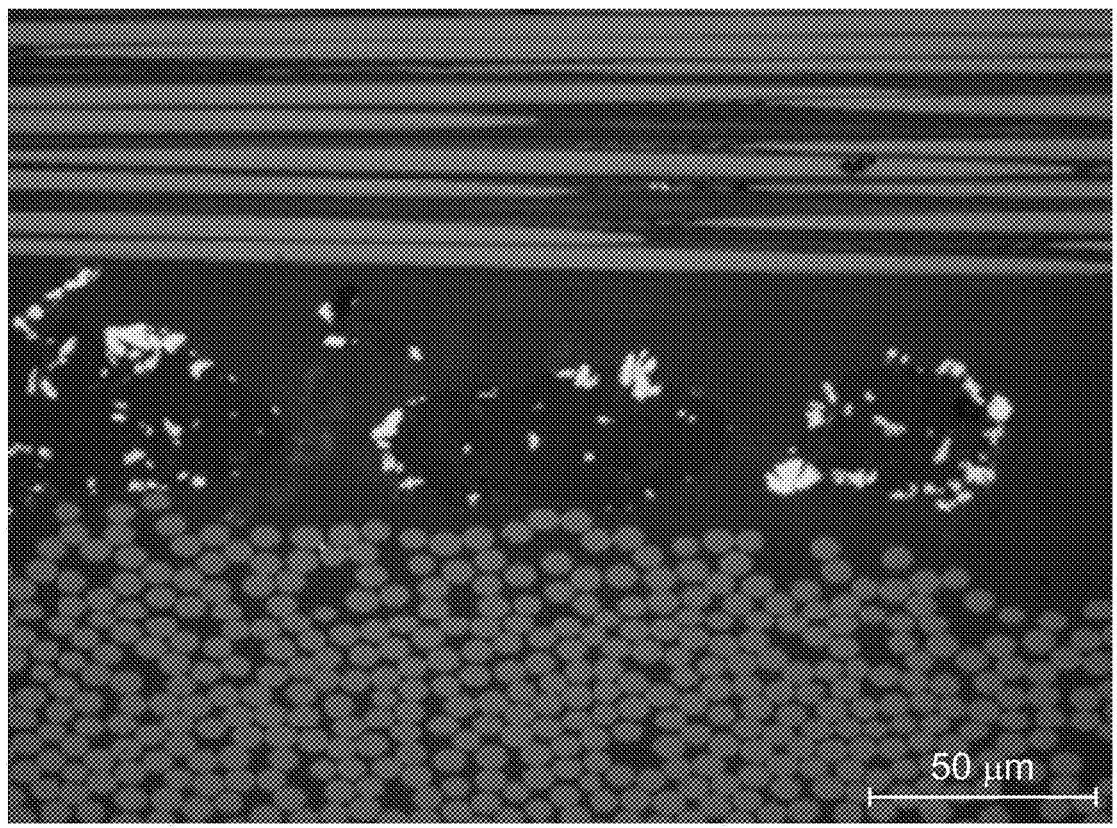
FIG. 6 is a micrograph showing a cross-section of a cured composite structure based on the incorporation of conductive Copper/PES particles in the interlaminar region.

By contrast, the PES-based particles in panel 5A substantially dissolved into the epoxy matrix during the curing cycle, releasing the copper particles into the interlaminar regions of composite panel. In such a way, conductive scaffolds or bridges are created between adjacent carbon fibre layers. FIG. 6 shows a cross-sectional view of the cured panel 5A containing 10% by volume of Cu/PES composite particles. As a result of the controlled dissolution mechanism, Cu/PES composite particles were found to provide about one order of magnitude of improvement in the z-direction conductivity as compared to non-conductive thermoplastic particles.

The above results further demonstrate that the selection of appropriate polymeric components for the conductive composite particles is critical in achieving the above described

TABLE 5

Dispersion conditions for composite PES/copper and Polyamide/copper blends

| Sample code | Temperature profile [° C.] | | | | | | | | | Screw speed [rpm] | Torque % |
| --- | --- | --- | --- | --- | --- | --- | --- | --- | --- | --- | --- |
| | Zone 1 | Zone 2 | Zone 3 | Zone 4 | Zone 5 | Zone 6 | Zone 7 | Zone 8 | Zone 9 | | |
| 5A | 200 | 255 | 310 | 335 | 360 | 360 | 365 | 360 | 350 | 250 | 95 |
| 5B | 150 | 180 | 230 | 220 | 220 | 220 | 215 | 215 | 210 | 200 | 50 |

In both cases, the pellets produced from the extruder were ground in a cryogenic grinding device to produce conductive composite micro-particles with a (d50) mean size of less than 50 µm. The micro-particles were then dispersed onto the surface of a 977-2-34%-194-IMS24K unidirectional tape at a particle loading of 10% by volume based on the total resin content in the tape, prior to laying-up. A plurality of such tapes was laid-up in an interleaved stacking sequence to form panels as described in Example 2. The panels were then cured in an autoclave for 3 hours at 180° C.

Z-direction conductivity values were recorded as described before and the results are shown in Table 6. The "Reference 1" panel as disclosed in Example 2 is used herein for comparison.

dissolution mechanism, which in turn, provides the improvements in z-direction conductivity for the composite structures.

Example 6

Effect of Conductive Particles: Non-Conductive Particles Ratio on Electrical Performance of Composites Four different panels (7A-7D) were fabricated and cured as described in Example 2 using the conductive composite Cu/PES particles described in Example 5 and non-conductive thermoplastic (TP) particles at different conductive particles: non-conductive particles ratios shown in Table 7.

TABLE 6

Particle interleaved composites and corresponding electrical performance

| Sample code | Non-conductive TP particle content (vol %) | Conductive Cu/PES particle content (vol %) | Conductive Cu/Polyamide particle content (vol %) | Conductivity (S/m) |
| --- | --- | --- | --- | --- |
| REFERENCE 1 | 10 | — | — | 0.04 |
| 5A | — | 10 | — | 0.38 |
| 5B | — | — | 10 | 0.06 |

FIG. 5A shows a cross-section of the cured panel (5B) containing Cu/Polyamide composite particles in the interlaminar region, and FIG. 5B is an exploded view (in dark field) of a portion of the interlaminar region. It can be seen The z-direction conductivity of the cured panels was measured and the results are shown in Table 7. The "Reference 1" panel as disclosed in Example 2 is used herein for comparison.

TABLE 7

Effect of different conductive:non-conductive interlaminar
particles ratios on composite electrical performance

| Sample code | Non-conductive TP particle content (vol %) | Conductive Cu/PES particle content (vol %) | Conductivity (S/m) |
|---|---|---|---|
| REFERENCE 1 | 10.0 | — | 0.04 |
| 7A | 7.5 | 2.5 | 0.18 |
| 7B | 5.0 | 5.0 | 0.24 |
| 7C | 2.5 | 7.5 | 0.31 |
| 7D | 0 | 10 | 0.38 |

As shown in Table 7, there is a clear improvement trend in the z-direction conductivity with increasing loading of the Cu/PES composite particles.

Ranges disclosed herein are inclusive and independently combinable (e.g., ranges of "up to approximately 25 vol %, or, more specifically, approximately 5 vol % to approximately 20 vol %" is inclusive of the endpoints and all intermediate values of the ranges).

While various embodiments are described herein, it will be appreciated from the written description that various combinations of elements, variations or improvements therein may be made by those skilled in the art, and are within the scope of the present disclosure. In addition, many modifications may be made to adapt a particular situation or material to the teachings of the present disclosure without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A curable composite material comprising:
   i) at least one structural layer of reinforcing fibres impregnated with a curable resin matrix; and
   ii) at least one electrically conductive composite particle adjacent or in proximity to said reinforcing fibres, wherein said conductive composite particle is formed from a blend of a conductive material and a polymeric material, and the polymeric material in the conductive composite particle comprises one or more thermoplastic polymers that are initially in a solid phase and substantially insoluble in the curable resin matrix prior to curing of the composite material, but is able to undergo at least partial phase transition to a fluid phase by dissolving in the resin matrix during a curing cycle of the composite material, and wherein the one or more thermoplastic polymers has/have a glass transition temperature ($T_g$) of greater than 200° C.

2. The composite material of claim 1, wherein said curable resin matrix is a thermoset composition in which at least 50% of the polymeric material in of the conductive composite particle is soluble in the resin matrix during curing of the composite material, and wherein the phase transition to the fluid phase occurs by dissolution of the polymeric material in the resin matrix.

3. The composite material of claim 1, wherein the conductive material in each electrically conductive composite particle comprises one or more conductive materials having an electrical conductivity greater than $1 \times 10^3$ S/m.

4. The composite material of claim 1, wherein the conductive material in each electrically conductive composite particle comprises one or more conductive materials selected from metallic materials, non-metallic conductive materials, and combinations thereof.

5. The composite material of claim 1, wherein the conductive material in the electrically conductive composite particle comprises one or more metallic materials selected from silver, gold, platinum, palladium, nickel, copper, lead, tin, aluminum, titanium, alloys and mixtures thereof.

6. The composite material of claim 1, wherein the conductive material in the electrically conductive composite particle comprises one or more non-metallic conductive materials selected from carbon, graphene, graphite, and combination thereof.

7. The composite material of claim 1, wherein the polymeric material comprises a polyethersulphone.

8. The composite material of claim 1, wherein the polymeric material in the conductive composite particle further comprises at least one thermoset resin.

9. The composite material of claim 8, wherein the polymeric material in the conductive composite particle further comprises a curing agent or a catalyst.

10. The composite material of claim 1, wherein the weight content of the conductive material in the conductive composite particle relative to the total weight of the conductive composite particle is from 1% to 90%.

11. The composite material of claim 1, wherein a plurality of electrically conductive composite particles are present at a content of 0.1% to 25% by volume based on the volume of the total resin content in the composite material.

12. The composite material of claim 1, wherein a plurality of electrically conductive composite particles are present, and the particles have a mean particle size of less than 150 μm.

13. The composite material of claim 1 further comprising non-conductive particles, wherein the conductive composite particles combined with non-conductive particles are present at a content of up to 25% by volume based on the volume of the total resin content in the composite material.

14. The composite material of claim 1, wherein said curable resin matrix comprises one or more thermoset resins selected from the group consisting of: epoxy resins, bismaleimide, vinyl ester resins, cyanate ester resins, isocyanate-modified epoxy resins, phenolic resins, benzoxazine, formaldehyde condensate resins, polyesters, acrylics, and combinations thereof.

15. The composite material of claim 1, further comprises a second structural layer of reinforcing fibres impregnated with a curable resin matrix, wherein said at least one conductive composite particle is located between the layers of reinforcing fibres of the first and second structural layers.

16. A curable composite laminate comprising:
   a structural layer of reinforcing fibres impregnated with a first curable resin matrix; and
   a layer of a second curable resin matrix in contact with one of two opposing surfaces of the structural layer,
   wherein said second curable resin matrix comprises a plurality of conductive composite particles and said first curable resin matrix is void of any composite conductive particle, and
   wherein each conductive composite particle is formed from a blend of a conductive material and a polymeric material, and the polymeric material comprises one or more thermoplastic polymers that are initially in a solid phase and substantially insoluble in the curable resin matrix prior to curing of the composite laminate, but is able to undergo at least partial phase transition to a fluid phase by dissolving in the second resin matrix during a curing cycle of the composite laminate, and wherein the one or more thermoplastic polymers has/have a glass transition temperature ($T_g$) of greater than 200° C.

\* \* \* \* \*